Dec. 20, 1938.  F. R. HENSEL ET AL  2,140,910
SOLDERING IRON TIP
Filed May 15, 1937

INVENTORS
Franz R. Hensel
BY Earl I. Larsen
ATTORNEY

Patented Dec. 20, 1938

2,140,910

UNITED STATES PATENT OFFICE 2,140,910

SOLDERING IRON TIP

Franz R. Hensel and Earl I. Larsen, Indianapolis, Ind., assignors to P. R. Mallory & Co., Inc., Indianapolis, Ind., a corporation of Delaware Application May 15, 1937, Serial No. 142,783

1 Claim. (Cl. 113—105)

This invention relates to soldering irons and more particularly to the tips therefor.

An object of the invention is to improve the composition of soldering irons or tips therefor.

Another object is to provide a metal suitable for soldering irons and the like which has high heat conductivity, high hardness which is retained at elevated temperatures and which will resist inter-crystalline penetration and attack of liquid metals, such as solders, and of chemical reagents.

Other objects of the invention will be apparent from the following description taken in connection with the appended claim.

The present invention comprises the combination of elements, methods of manufacture, and the product thereof brought out and exemplified in the disclosure hereinafter set forth, the scope of the invention being indicated in the appended claim.

While a preferred embodiment of the invention in described herein, it is contemplated that considerable variation may be made in the method of procedure and the combination of elements without departing from the spirit of the invention.

Figure 1:
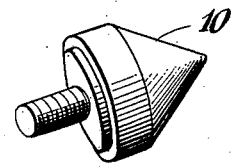
Figure 1 shows a tip for an electric soldering iron.

Up to the present time pure copper has been used for soldering iron tip material. One of the outstanding disadvantages of copper is that it corrodes rapidly and wears away very quickly. This is particularly noticeable in high speed production lines where the soldering irons have to withstand very severe service. In the case of tips of small diameter the softening of the pure copper at elevated temperatures causes the tips to bend, particularly in instances where the materials to be soldered are relatively heavy, such as plates and metal parts, in which case a great deal of presure is exerted on the tip to bring the metal parts up to a temperature where the solder will flow freely.

According to the present invention we have provided a soldering iron tip of a copper base alloy containing cobalt.

We have discovered that cobalt produces alloys with copper which have unusually good properties for use in soldering iron tips. The cobalt appears to produce an alloy with copper which is highly resistant to the inter-crystalline penetration of soldering materials such as solders and soldering fluxes and reagents. Binary copper-cobalt alloys containing cobalt in the order of .01 to 10% exhibit this valuable property and also have good heat conductivity, abrasion resistance and mechanical strength.

The copper-cobalt alloys may be much improved for soldering purposes, however, by the addition of small amounts of certain age-hardening ingredients preferably phosphorus or silicon or both of these elements. Thus an alloy of—

| | Per cent |
|---|---|
| Phosphorus | .01 to 2 |
| Cobalt | .01 to 10 |
| Copper | Balance | may be age-hardened to produce an excellent soldering iron tip of high hardness and strength and heat conductivity.

Likewise an alloy of—

| | Per cent |
|---|---|
| Silicon | .01 to 2 |
| Cobalt | .01 to 10 |
| Copper | Balance | will lend itself to age-hardening and provide a soldering tip of similarly excellent characteristics.

Our preferred age-hardening alloy contains both phosphorus and silicon according to the following composition:

| | Per cent |
|---|---|
| Phosphorus | .01 to 2 |
| Silicon | .01 to 2 |
| Cobalt | .01 to 10 |
| Copper | Balance | but in this instance the total content of phosphorus plus silicon should not materially exceed 2%.

The alloys of this invention can be made by well-known methods after which they may be cast into finished shape or may be cast and then further cold drawn or worked and formed into the shape desired. In any case a heat treatment should be applied to increase the hardness and strength of the alloys and to improve their heat conductivity. The heat treatment preferably comprises quenching the alloy from a temperature above 600° C., such as 950° C., and subsequently aging at a temperature below 600° C., such as 450° C. to 600° C. for several hours. The age-hardening thus produced in these alloys takes place by virtue of a precipitation hardening ingredient. In binary copper-cobalt systems the solubility of cobalt in copper decreases with decreasing temperature, the cobalt being soluble in copper in the solid state only to a limited extent. Where phosphorus or silicon is added cobalt phosphide or silicide is formed and these compounds have a still lower solid solubility in copper than does cobalt. The precipitation hardening effect is therefore greater where phosphorus or silicon or both these elements are added to a copper-cobalt alloy. These compounds also impart hardening with less reduction in heat conductivity than does cobalt alone.

Figure 2:
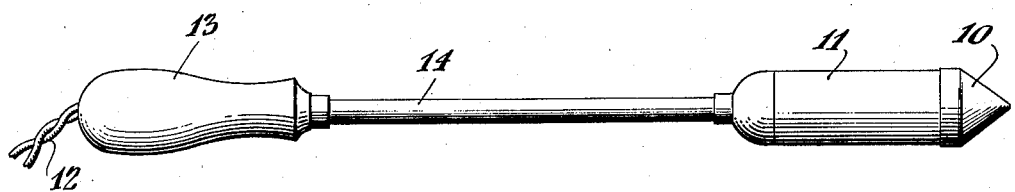
Figure 2 shows the iron itself.

Figure 1 shows a soldering iron tip 10 formed from the alloy either by casting or by cold working and other shaping operations. In Figure 2 the tip 10 is shown secured to an electric soldering iron heating unit 11 which is heated by an electric resistance element within the unit supplied with electricity by cord 12 which passes through handle 13 and tubular shank 14.

Figure 3:
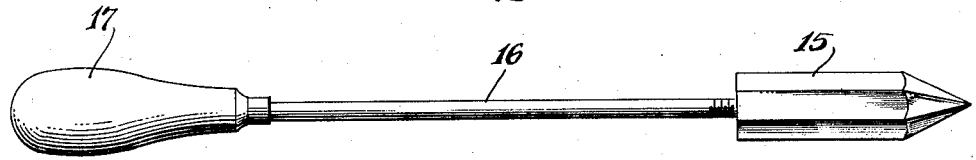
Figure 3 shows a simple soldering iron adapted to be heated by gas or other fuel.

Figure 3 shows a simple soldering iron 15 of the present alloy secured to shank portion 16 on handle 17 and adapted to be heated from an external heat source, such as by a gas flame.

Soldering tips of a hardness of 75 to 95 Rockwell B can be obtained with our composition and with comparatively high strength, abrasion resistance and resistance to corrosion and intercrystalline penetration.

An alloy having the composition—

|  | Per cent |
|---|---|
| Phosphorus | .3 |
| Silicon | .3 |
| Cobalt | 2.5 |
| Copper | Balance | when tested in soldering iron tips demonstrated the superiority of the alloy for this purpose as compared with copper and other copper alloys.

The tests were conducted in such a manner that three soldering iron holders were arranged over a steel plate, the tips bearing on this plate with a pressure of 2.25 pounds. On the steel plate a solder pot was placed which was maintained at about 280° C. The steel plate rotated at a speed of 18 revolutions a minute, each tip dipping into the solder once every revolution. The weight loss in 50 hours was measured. The test tip was ⅜" in diameter and 6" long. The material was tested in several conditions:

1. As chill cast, heat treated and cold worked, the weight loss was .625 gram.
2. As chill cast, heat treated and not cold worked, the weight loss was .504 gram.
3. As sand cast and heat treated the weight loss was .460 gram.

By comparison the weight loss of hard drawn copper in a similar test was 1.603 grams. Tests were also made with copper alloys containing small percentages of cadmium or chromium. The weight loss of these alloys was 3 to 4 times as high as that of our new alloy.

A further test was an immersion test in which various materials of a shape similar to a soldering iron were dipped in a pool of molten solder to a depth of approximately 1". The temperature of the molten solder was constant. At the start of the test all of the materials were tinned and the solder was changed each 24 hours. The test tips were removed every 24 hours, cleaned of excess solder and the weight loss and percent reduction in area caused by dissolving of the tip in molten solder determined. At the end of the test it was found that 60% of the original cross sectional area of the pure copper had been dissolved away whereas only 35% of the original area of our new improved alloy has been dissolved by the molten solder.

The hardness of the tips were investigated after various intervals of heating at the operating temperatures. While pure copper was completely softened to a minus Rockwell B reading, our new alloy retained 100% of its original hardness of 75 to 95 Rockwell B, according to the composition and heat treatment.

Tests were also made to determine the heat conductivity of our material under practical working conditions by comparing the time required for our alloy tip to heat with that required to heat a pure copper tip when placed in a standard electric soldering iron holder. It was found that the alloy tip reached approximately the same temperature in the same length of time and with equal power input.

The inherent characteristics of our soldering iron alloys are not materially changed by the presence of certain other elements frequently found in copper alloys intentionally or as impurities or used in the manufacture thereof for deoxidizing purposes. We have examined alloys of the present invention containing negligible proportions up to several percent cadmium, zinc and magnesium which are frequently used for deoxidizing purposes, some of the elements being retained in the finished metal. We have found that up to 1.2% cadmium and up to 5% zinc may be used in the alloy without reducing the degree of hardness obtainable and with some improvement in the oxidation resistance. Other elements which may be present in small proportions include silver, manganese, iron, nickel, tin, antimony, lead, arsenic, aluminum, beryllium, lithium and calcium.

In order to reduce the surface oxidation of the members due to heating, particularly in the region not covered by solder, it may, in some instances, be desirable to apply an external plating of chromium or some other oxidation protective material. This coating has little effect on the resistance of the tips to the attack of liquid solder but will protect the part not covered by the solder from oxidation.

We have described a material for soldering iron elements which will withstand the attack of liquid metals such as solder and of reagents such as soldering fluxes. This material is also of higher hardness, a Rockwell B hardness of 90 or more being possible. The strength and abrasion resistance of the material enables the tips to be used with resulting long life under severe working conditions.

The thermal conductivity of the material is comparable to that of pure copper.

While the present invention, as to its objects and advantages, has been described herein as carried out in specific embodiments thereof, it is not desired to be limited thereby but it is intended to cover the invention broadly within the spirit and scope of the appended claim.

What is claimed is:

A soldering iron tip adapted for use in contact with molten solder, said tip being formed of an age-hardened copper alloy, said alloy being composed principally of copper and containing precipitation hardening compounds of a type adapted to resist attack and intercrystalline penetration of molten solder and consisting of cobalt silicide and cobalt phosphide in amounts sufficient to effect precipitation hardening of said copper.

FRANZ R. HENSEL.
EARL I. LARSEN.